(12) United States Patent
Jeon et al.

(10) Patent No.: US 7,998,613 B2
(45) Date of Patent: Aug. 16, 2011

(54) LITHIUM ION SECONDARY BATTERY HAVING ENHANCED WELDABILITY AND SEALING CAPABILITY

(75) Inventors: Tae-Hyun Jeon, Daejeon (KR); Hyun-Gook Yoon, Daejeon (KR); Geun-Chang Chung, Daejeon (KR)

(73) Assignee: Korea Power Cell Inc., Yseong-gu (KR)

( * ) Notice: Subject to any disclaimer, the term of this patent is extended or adjusted under 35 U.S.C. 154(b) by 1028 days.

(21) Appl. No.: 10/572,506

(22) PCT Filed: Sep. 13, 2004

(86) PCT No.: PCT/KR2004/002317
§ 371 (c)(1),
(2), (4) Date: Mar. 17, 2006

(87) PCT Pub. No.: WO2005/029611
PCT Pub. Date: Mar. 31, 2005

(65) Prior Publication Data
US 2007/0059594 A1      Mar. 15, 2007

(30) Foreign Application Priority Data
Sep. 19, 2003   (KR) .................. 10-2003-0065237

(51) Int. Cl.
H01M 2/06 (2006.01)
H01M 2/00 (2006.01)

(52) U.S. Cl. ........ 429/179; 429/163; 429/164; 429/174; 429/176; 429/178

(58) Field of Classification Search .................. None
See application file for complete search history.

(56) References Cited

U.S. PATENT DOCUMENTS
1,424,144 A * 7/1922 Kunkel .................. 429/177
(Continued)

FOREIGN PATENT DOCUMENTS
JP          50-145418          5/1949
(Continued)

OTHER PUBLICATIONS
Machine translation of JP 2003-257385, Murashige Shinji, Sep. 12, 2003.*

Primary Examiner — Dah-Wei D Yuan
Assistant Examiner — Kwang Han
(74) Attorney, Agent, or Firm — Oliff & Berridge, PLC

(57) ABSTRACT

A thin and wide area lithium ion secondary battery is disclosed. The lithium ion secondary battery has a container having a flange extended outwardly from a region where a terminal is located in the container, and constituted by a can and a cap having preferred shapes, respectively, wherein the flange of the can is welded at an outer surface of the flange to an outer surface of the flange of the cap by means of micro-arc welding. A cooling jig can be easily installed to the container, allowing efficient removal of problems caused by heat upon welding, resulting in allowing application of micro-arc welding thereto without generating damage of the interior or the battery caused by heat. Accordingly, more economical and stable butt welding can be performed, thereby remarkably reducing defect occurrence rates causing leakage problem of the resulting battery, and manufacturing costs of the lithium secondary battery.

5 Claims, 3 Drawing Sheets

U.S. PATENT DOCUMENTS

| | | | |
|---|---|---|---|
| 5,279,623 A * | 1/1994 | Watanabe et al. | 29/25.03 |
| 6,451,473 B1 | 9/2002 | Saito et al. | |
| 6,746,798 B1 * | 6/2004 | Hiratsuka et al. | 429/163 |

FOREIGN PATENT DOCUMENTS

| | | | |
|---|---|---|---|
| JP | A 58-157050 | | 9/1983 |
| JP | A 58-158858 | | 9/1983 |
| JP | A 59-5569 | | 1/1984 |
| JP | 2000-058010 | | 2/2000 |
| JP | 2000-260478 | | 9/2000 |
| JP | 2000-301345 | | 10/2000 |
| JP | 2001-250517 | | 9/2001 |
| JP | 2001-291466 | | 10/2001 |
| JP | 2003-257385 | | 9/2003 |
| WO | WO 99/25036 | * | 5/1999 |

* cited by examiner (1)

(2)

LITHIUM ION SECONDARY BATTERY HAVING ENHANCED WELDABILITY AND SEALING CAPABILITY

TECHNICAL FIELD

The present invention relates to a lithium ion secondary battery, and, more particularly, to a thin and wide area lithium ion secondary battery having enhanced sealing of a container.

BACKGROUND ART

According to expansion in market share of portable electronic applications, such as mobile phones and notebook computers, and diversification of the kinds thereof, demand for secondary batteries for rechargeable power supply is increasing. Furthermore, due to miniaturization, lightweightness, high performance, and various functionalities of the portable electronic applications, a continuous increase in energy storage density is needed for the secondary battery used for the power supply. Recently, in order to satisfy such a need, a lithium ion secondary battery has been spotlighted as a new power source for portable electronic applications due to its relatively light weight, large energy density per unit volume, and long life span of charging and discharging in comparison with a conventional aqueous solution based secondary battery, such as nickel-cadmium or nickel-hydrogen batteries.

The lithium ion secondary battery comprises a closed container consisting of a can and a cap, and an electrode assembly inserted into the container. The electrode assembly comprises a cathode plate containing lithium or lithium metallic compound oxides, an anode plate containing carbon-based anode active material to absorb and discharge lithium, and a separation membrane for separating the cathode and the anode from each other and containing an electrolyte consisting of non-aqueous organic solvents and lithium salts.

FIG. 1 is a schematic diagram illustrating the shapes of a can and a cap, which constitute a container of a conventional lithium ion secondary battery, and a sealing method thereof.

Referring to FIG. 1, a can 10 has a barrel shape, which has a space defined therein and a polygonal cross-section, and a plate-shaped cap 20 is coupled to the can 10 such that an outer peripheral surface of the cap 20 closely contacts an inner side of the can 10. Here, the cap 20 is welded to the can 10 by means of laser welding along a region where the can 10 closely contacts and the cap 20, thereby providing the sealed container.

When the cap is welded to the can with the electrode inserted into the can, as described above, it must be considered above all that perfect sealing of the container must be ensured, thereby perfectly preventing leakage of the electrolyte and introduction of moisture from the outside, while preventing components of the battery and the electrode therein from being damaged or deformed due to heat generated upon welding. However, with the shape of the container as shown in FIG. 1, there is a problem in that it is very difficult to provide an effective cooling jig for shielding and dissipating a weld heat to the container. Thus, a laser welding method providing a relatively lower weld heat is generally employed. In particular, pulse laser welding that creates a discrete welding bead is preferred to continuous laser welding. Meanwhile, such a pulse laser welding method has a drawback in that it provides a small-sized welding bead, and that the welding quality is sensitively changed in relation to a welding focus, thereby making it very difficult to provide perfect sealing of the container without a precise mechanical construction of battery containers as well as welding equipment. Additionally, it has a drawback in that sufficiently reliable sealing can be secured only when the welding bead of such a small size (0.2~0.6 mm in diameter) sufficiently overlaps to each other such that approximately 70% or more of welding bead is overlapped with the adjacent welding bead. As a consequence, welding speed is relatively slow. Accordingly, in the case where butt welding is performed as shown in (1) of FIG. 1, if the members do not perfectly contact each other due to contaminants or deformation, a non-welded portion or a minute crevice can be locally created, thereby causing leakage problem of the resulting battery. Additionally, laser light may be transmitted through a gap between the welded members, damaging the electrodes and the like. When lap welding is performed as shown in (2) of FIG. 1, the above problem can be overcome. Meanwhile, according to the lap welding, since an upper material must be totally melted while partially melting a lower material, a relatively large energy is injected thereto, and thus the cooling jig has an important role in comparison to other constructions. However, since it is difficult to install the cooling jig on the container, as described above, due to interference with the electrode, lap welding is not an efficient method.

Since such drawbacks as described above cause more severe problems in the case where a battery enclosure has a smaller thickness and where a sealed region has an increased total length, these drawbacks are recognized as a severe technological limitation particularly when realizing a thin and wide area battery. Accordingly, it is necessary to enhance the structure of the can and the cap, introduce effective cooling mechanism and to provide a new sealing method.

DISCLOSURE

Technical Problem

Therefore, the present invention has been made in view of the above problems, and it is an object of the present invention to provide an enhanced thin and wide area lithium ion secondary battery, which is enhanced in weldability and sealing capability, thereby remarkably reducing manufacturing costs thereof.

Technical Solution

In accordance with one aspect of the present invention, the above and other objects can be accomplished by the provision of a lithium ion secondary battery, comprising: a can having a space defined therein while being opened at an upper portion thereof, and a flange extended outwardly from an upper end of the can; a cap having a contact surface facing the flange of the can; and an electrode assembly inserted into the can and including a cathode plate and an anode plate, wherein the flange of the cap is welded at an outer surface of the flange to an outer surface of the cap by means of micro-arc welding, thereby forming a sealed container.

In accordance with another aspect of the present invention, there is provided a lithium ion secondary battery, comprising: a cap having a space defined therein while being opened at a lower portion thereof, and a flange extended outwardly from a lower end of the cap; a can having a space defined therein while being opened at an upper portion of the can, and a flange extended outwardly from an upper end of the can and facing the flange of the cap, the flange of the can having a predetermined region having a width larger than that of the flange of the cap such that an inner end of the predetermined region is located inside an inner end of the flange of the cap; an electrode assembly inserted into the can and including a cathode plate and an anode plate; and a protruded terminal connected to one of the cathode plate and the anode plate, while being protruded to the outside through a predetermined area of the can having a width larger than that of the flange of the cap, wherein the flange of the cap is welded at an outer surface of the flange to an outer surface of the flange of the cap by means of micro-arc welding, thereby forming a sealed container.

In accordance with yet another aspect of the present invention, there is provided a lithium ion secondary battery, comprising: a can having a space defined therein while being opened at an upper portion thereof, and a flange extended outwardly from an upper end of the can, the can having a step formed on one side wall thereof, in such a manner that the can has a first lower surface, a fist side wall extended upwardly from the first lower surface, a second lower surface located higher than the first lower surface while being extended outwardly from the first side wall, and a second side wall extended upwardly from the second lower end; a cap having a contact surface facing the flange of the can; an electrode assembly located on the first lower surface and including a cathode plate and an anode plate; and a protruded terminal connected to one of the cathode plate and the anode plate, while being protruded to the outside through the second lower surface of the can, wherein the flange of the can is welded at an outer surface of the flange to an outer surface of the can by means of micro-arc welding, thereby forming a sealed container.

ADVANTAGEOUS EFFECTS

As is apparent from the above description, according to the lithium ion secondary battery, a container has a flange extended outwardly from a region where a terminal is located in the container, and is constituted by a can and a cap having preferred shapes, respectively, so that a cooling jig can be easily installed to the container while reducing welding degradation, thereby efficiently removing the problems caused by heat generated upon welding, resulting in preventing the interior of the battery from being damaged by the heat and allowing application of micro-arc welding thereto. Accordingly, more economical and stable butt welding can be performed, thereby remarkably reducing defect occurrence rates causing leakage problem of the resulting battery, and manufacturing costs for a thin and wide area lithium secondary battery.

Additionally, instead of the conventional laser welding, the micro-arc welding can be performed, and allows continuous welding, thereby preventing defects which can cause the leakage problem of the resulting battery. As the micro-arc welding provides a lower straight penetration of welding sparks and forms large welding pools, the butt welding can be performed by means of the micro-arc welding, thereby reducing the total manufacturing costs.

It is apparent that the present invention is not limited to the above embodiments, and those skilled in the art will note that various modifications, variations and substitutions may be made to those embodiment disclosed herein without from the scope and spirit of the present invention.

DESCRIPTION OF DRAWINGS

The above and other objects, features and other advantages of the present invention will be more clearly understood from the following detailed description taken in conjunction with the accompanying drawings, in which.

BEST MODE

Preferred embodiments of the present invention will now be described with reference to the accompanying drawings.

Figure 1:
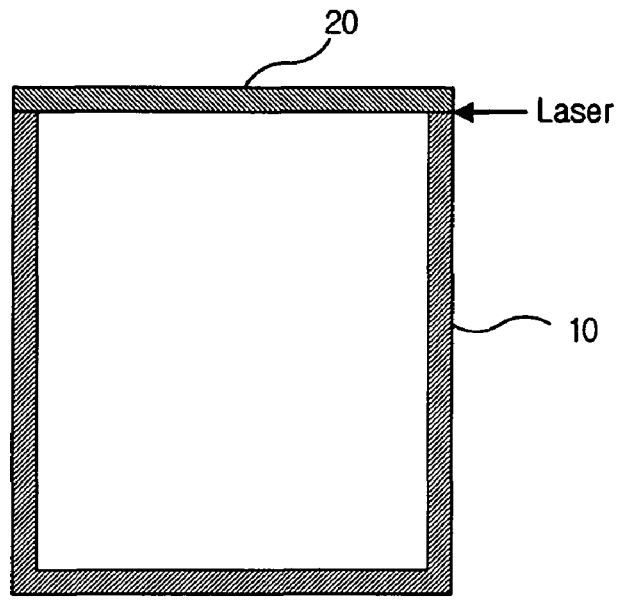
FIG. 1 is a schematic view illustrating the shape of a can and a cap, which constitute a container of a conventional lithium ion secondary battery, and a sealing method thereof.
Figure 1:
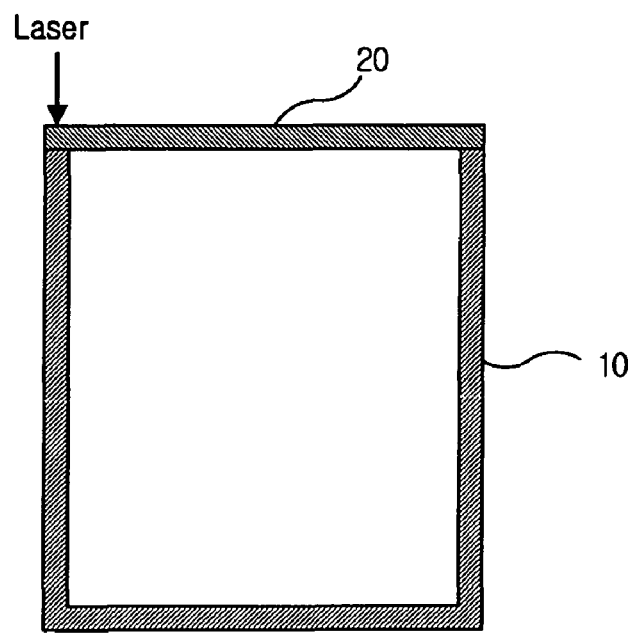
Figure 2:
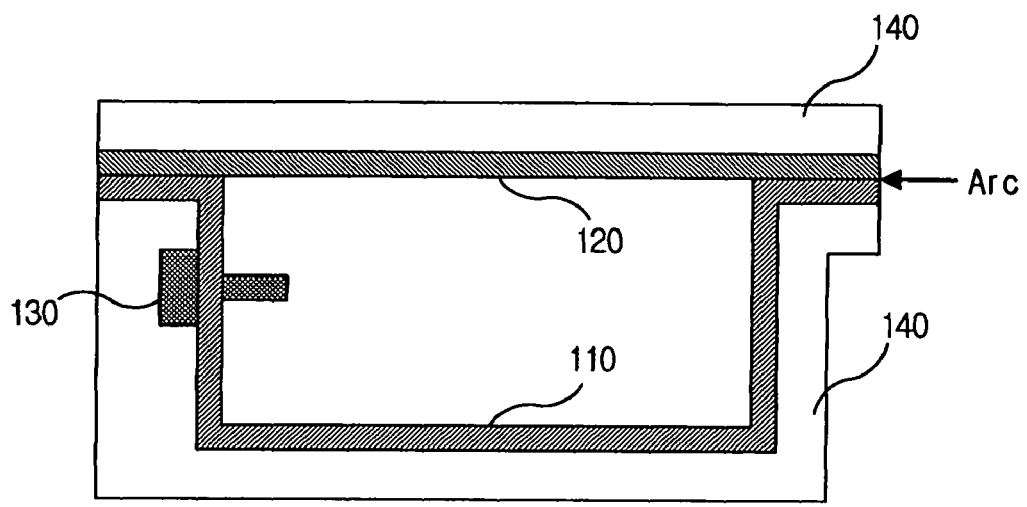
FIGS. 2 to 4 are schematic views illustrating a lithium ion secondary battery according to embodiments of the present invention, and a sealing method thereof.
Figure 3:
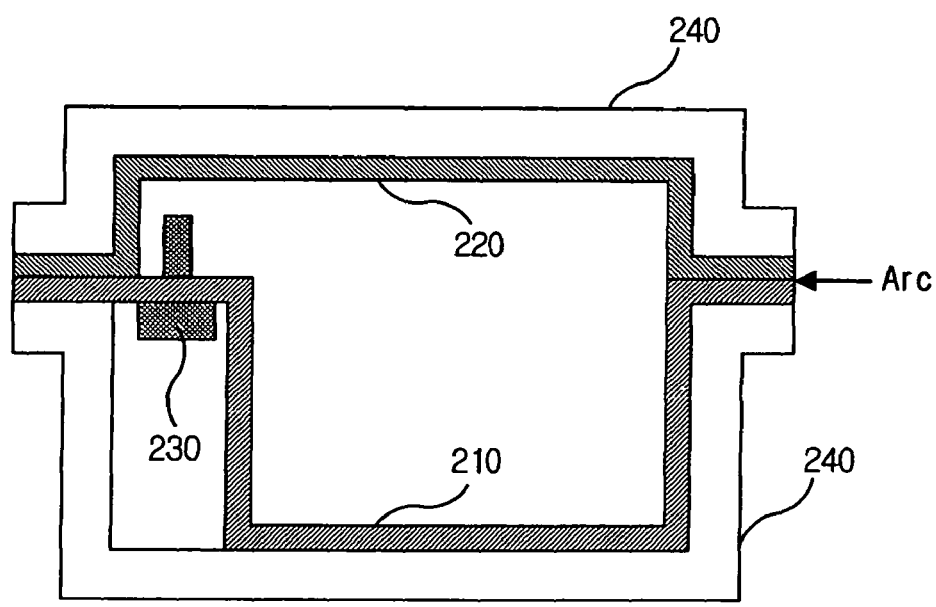
Figure 4:
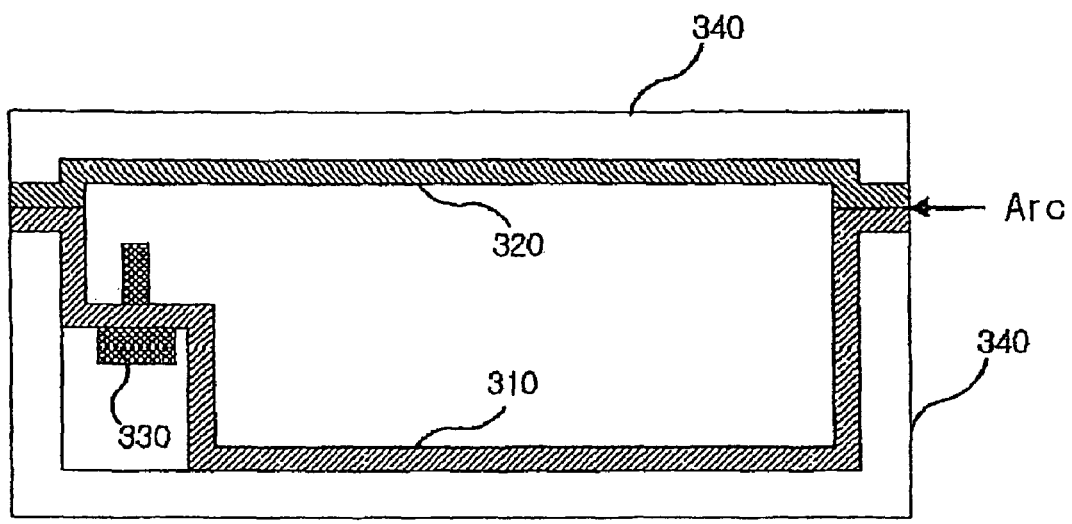

FIGS. 2 to 4 are schematic views illustrating a lithium ion secondary battery according to embodiments of the present invention, and a sealing method thereof.

Embodiment 1

Referring to FIG. 2, a lithium ion secondary battery according to a first embodiment of the present invention comprises a sealed container constituted by a can 110 and a cap 120, an electrode assembly (not shown) located within the container and including a cathode plate and an anode plate, and terminals connected to the cathode plate and the anode plate, respectively. The terminals comprise an anode terminal connected to the anode plate, and a cathode terminal connected to the cathode plate. Generally, one of the anode terminal and the cathode terminal is formed by connecting one of the can and the cap to one of the anode plate and the cathode plate, and the other is exposed to the outside by use of an additional connecting member. Hereinafter, the terminal exposed to the outside by use of the additional connecting member will be referred to as protruded terminal 130.

The can 110 has a space defined therein while being opened at an upper portion thereof, and a flange extended outwardly from an upper end of the can 110. At this time, the flange has a width of 0.3 mm or more while being in the range of 5% or more of a long side length of the battery. If the flange has too small an extended width, installation of a cooling jig and welding operation become difficult upon welding to the cap 120, on the contrary, if the flange has too wide an extended width, an energy density per unit volume of the lithium ion secondary battery is lowered.

The cap 120 has a contact surface facing the flange of the can 110. The cap 120 may have a variety of shapes according to the utility of the cap. For instance, the cap 120 may have a flat plate shape having a circumference the same as that of the flange of the can 110, and may have a structure wherein the cap 120 has a space defined therein while being opened at a lower portion thereof, and a flange having a circumference the same as that of the flange of the can 110.

The electrode assembly is inserted into the space of the can 110.

The protruded terminal 130 is connected to the cathode plate or the anode plate which constitute the electrode assembly, and is protruded to the outside through one side wall of the can 110 or through the cap 120.

According to the present invention, in order to form the container, the flange of the can 110 is welded, at an outer surface of the flange, to an outer surface of the cap 120 by means of micro-arc welding, preferably by means of microplasma welding. When comparing the micro-arc welding of the present invention with the laser welding for welding the can and the cap in the prior art, the micro-arc welding of the invention enables continuous welding, thereby providing an advantage of preventing defects which can cause leakage problem of the resulting battery, whereas the conventional laser welding used for lithium ion batteries is pulse welding and the probability of causing welding defects such as pin holes increases that can cause the leakage problem of the resulting battery. Additionally, as the micro-arc welding provides a lower straight penetration of welding sparks, and forms large welding pools, butt welding can be performed using the outer surface of the can and the outer surface of the cap instead of lap welding. Moreover, as an arc welding apparatus has a lower price than that of a laser welding apparatus, the total manufacturing costs of the battery can be reduced.

As described above, as the flanges are provided to the container such that they are extended outwardly to a location farther than a region where the protruded terminal 130 is provided in the container, the cooling jig 140 can be installed and contacted to the container such that only the outer surface of the can 110 and the outer surface of the cap 120 are exposed to the outside, thereby solving the problems caused by heat upon welding.

Embodiment 2

Referring to FIG. 3, as with the first embodiment, a lithium ion secondary battery according to a second embodiment of the present invention comprises a can 210, a cap 220, an electrode assembly (not shown), and a protruded terminal 230. The can 210 and the cap 220 are welded to each other by micro-arc welding, and constitute a sealed container. The second embodiment has a constitution similar to that of the first embodiment, except for shapes of the can and the cap, and for an installation position of the protruded terminal in view of weldability and easy installation of a cooling jig. Accordingly, repetitious description will be omitted for clarity when describing the second embodiment.

The cap 220 has a space defined therein while being opened at a lower portion thereof, and a flange extended outwardly from a lower end thereof. At this time, the flange has the same width as that of the first embodiment.

The can 210 has a space defined therein while being opened at an upper portion of the space, and a flange, which is protruded outwardly from an upper end of the can 210 and faces the flange of the cap 220. At this time, the flange of the can 210 has a predetermined region having a width larger than that of the flange of the cap 220 such that an inner end of the predetermined region is located inside an inner end of the flange of the cap 220.

The protruded terminal 230 is protruded to the outside through the predetermined area provided to the flange of the can 210 while having a width larger than that of the flange of the cap 220.

As such, although the protruded terminal 230 is protruded through the flange of the can 210, the protruded terminal 230 is protruded to the outside through the predetermined area having a width larger than other areas, thereby allowing easy installation of the cooling jig 240, which is contacted to the container.

Embodiment 3

Referring to FIG. 4, as with the second embodiment, a third embodiment of the present invention also has a constitution similar to that of the first embodiment, except for shapes of a can and a cap, and for an installation position of a protruded terminal in view of weldability and easy installation of a cooling jig. Accordingly, repetitious description will be omitted for clarity when describing the third embodiment.

A can 310 has a space defined therein while being opened at an upper portion of the space. The can 310 has a two-stage step formed on one side wall thereof, in such a manner that the can 310 has a first lower surface, a fist side wall extended upwardly from the first lower surface, a second lower surface located higher than the first lower surface while being extended outwardly from the first side wall, and a second side wall extended upwardly from the second lower end. The can 310 has a flange extended outwardly from an upper end of the can 310. At this time, the flange has the same width as that of the first embodiment.

A cap 320 has a contact surface facing the flange of the can 310. The cap 320 may have a variety of shapes according to the utility of the cap 320. For instance, the cap 320 may have a flat plate shape having a circumference the same as that of the flange of the can 310, and may have a structure wherein the cap 320 has a space defined therein while being opened at a lower portion of the space, and a flange having a circumference the same as that of the flange of the can 310.

A protruded terminal 330 is protruded to the outside through the second lower surface of the can 310, and is electrically insulated from the can 310. At this time, as long as an insulated state between the protruded terminal 330 and the can 310 can be maintained, the protruded terminal 330 is located as close as possible to the first side wall of the can 310 where the two-stage step is formed on the can 310. This construction is provided for the purpose of allowing easy operation upon welding the can 310 and the cap 320.

As such, a two-stage step is formed on a region where the protruded terminal 330 is provided to the can 310, the cooling jig 340 can be installed and contacted to the container such that only the outer surface of the can 110 and the outer surface of the cap 120 can be exposed to the outside, thereby solving the problems caused by heat upon welding.

The invention claimed is:

1. A lithium ion secondary battery, comprising:
    a can having a space defined therein while being opened at an upper portion thereof, and a flange extended outwardly from an upper end of the can, the can having a two-stage step formed on one side wall thereof, in such a manner that the can has a first lower surface, a first side wall extended upwardly from the first lower surface, a second lower surface located higher than the first lower surface and extending outwardly from the first side wall, and a second side wall extended upwardly from the second lower surface;
    a cap having a contact surface facing the flange of the can and the cap not being inserted into the can;
    an electrode assembly located on the first lower surface and including a cathode plate and an anode plate; and
    a protruded terminal connected to one of the cathode plate and the anode plate, and protruding through only the second lower surface to an outside of the can and located between the first side wall and the second side wall and located inwardly from the second side wall toward the defined space,
    wherein an outer surface of the flange of the can is micro-arc welded to an outer surface of the cap, thereby forming a sealed container and the protruded terminal is only located at the second lower surface of the can where the two-stage step is formed so that a cooling jig can be installed and contacted to the sealed container such that only the outer surface of the flange of the can and the outer surface of the cap are exposed to the outside.

2. The battery as set forth in claim 1, wherein the cap has a flat shape.

3. The battery as set forth in claim 1, wherein the cap has a flange facing the flange of the can, and a space formed therein while being opened at a lower portion of the space.

4. The battery as set forth in claim 1, wherein the flange has a width of 0.3 mm or more and 5% or less of a long side length of the battery.

5. The battery as set forth in claim 1, wherein the micro-arc welding is micro-plasma welding.

* * * * *